United States Patent [19]

Yoshida et al.

[11] Patent Number: 4,735,482

[45] Date of Patent: Apr. 5, 1988

[54] DEVICE FOR CLAMPING END PORTION OF OPTICAL FIBER

[75] Inventors: Noriyuki Yoshida; Kenichi Takahashi, both of Osaka, Japan

[73] Assignee: Sumitomo Electric Industries, Ltd., Osaka, Japan

[21] Appl. No.: 712,732

[22] Filed: Mar. 18, 1985

[30] Foreign Application Priority Data

Mar. 26, 1984 [JP] Japan .................. 59-56187

[51] Int. Cl.⁴ .................................................. G02B 6/36
[52] U.S. Cl. ............................... 350/96.20; 350/96.21
[58] Field of Search ............... 350/96.20, 96.21, 96.22

[56] References Cited

U.S. PATENT DOCUMENTS

| 3,946,467 | 3/1976 | Lukas et al. | 350/96.20 |
| 4,179,186 | 12/1979 | Tynes | 350/96.21 |
| 4,477,146 | 10/1984 | Bowen et al. | 350/96.20 X |
| 4,487,474 | 12/1984 | Nishie et al. | 350/96.21 |
| 4,519,672 | 5/1985 | Rogastadius | 350/96.20 |
| 4,607,911 | 8/1986 | Rhodes | 350/96.20 |

FOREIGN PATENT DOCUMENTS

| 0058344 | 8/1982 | European Pat. Off. | |
| 2194978 | 1/1974 | France | |
| 2391480 | 12/1978 | France | |
| 0009449 | 1/1977 | Japan | 350/96.20 |
| 56-11923 | 3/1981 | Japan | |
| 0085408 | 5/1983 | Japan | 350/96.20 |
| 0186710 | 10/1983 | Japan | 350/96.20 |
| 0036209 | 2/1984 | Japan | 350/96.20 |
| 2030314 | 2/1980 | United Kingdom | |
| 2040062 | 8/1980 | United Kingdom | |

*Primary Examiner*—William L. Sikes
*Assistant Examiner*—Akm E. Ullah
*Attorney, Agent, or Firm*—Cushman, Darby & Cushman

[57] ABSTRACT

A device for clamping an end portion of an optical fiber, including a cylindrical sleeve formed with an axially extending aperture for receiving the end portion of the optical fiber and at least one slit extending both radially from its outer side face to the aperture and axially through the sleeve along a plane containing an axis of the sleeve, and an adaptor. The outer side face of the sleeve is at least partly tapered into a tapered outer side face and the adaptor is formed with a tapered bore corresponding, in shape, to the tapered outer side face.

14 Claims, 2 Drawing Sheets

Fig. 1a PRIOR ART
Fig. 1b PRIOR ART
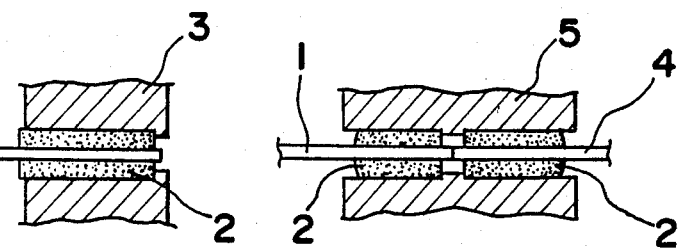
Fig. 2a
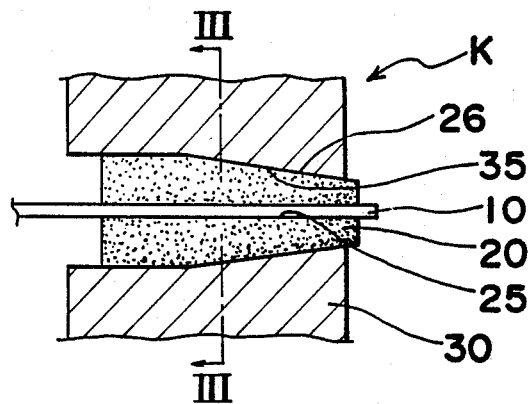
Fig. 2b
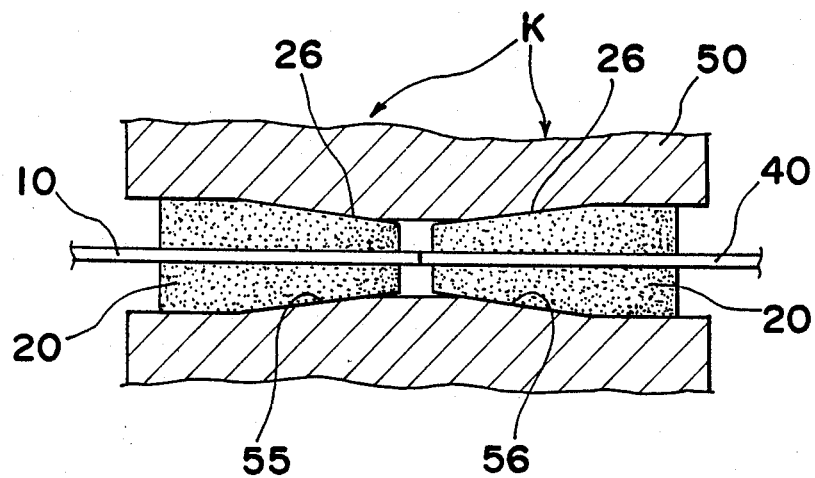

DEVICE FOR CLAMPING END PORTION OF OPTICAL FIBER

BACKGROUND OF THE INVENTION

The present invention generally relates to optical fibers and more particularly, to a device for detachably clamping an end portion of an optical fiber used for transmitting laser beams of high output, which end portion is fixed or joined to a mating end portion of another optical fiber.

Conventionally, in devices for clamping end portions of optical fibers, it has been generally so arranged, as shown in FIG. 1a, that in the case where an end portion of an optical fiber 1 is fixed, the end portion of the optical fiber 1 is fitted into an aperture of a cylindrical sleeve 2 having been subjected to high precision machining and then, the sleeve 2 having the end portion of the optical fiber 1 fitted thereinto is fitted into a highly precisely machined bore of an adaptor 3 such that the end portion of the optical fiber 1 is clamped in position. Meanwhile, in the known devices, it has been so arranged, as shown in FIG. 1b, that in the case where the end portion of the optical fiber 1 is joined to a mating end portion of another optical fiber 4, the end portions of the optical fibers 1 and 4 are fitted into the apertures of the sleeves 2, respectively and then, the sleeves 2 having the end portions of the optical fibers 1 and 4 fitted thereinto, respectively are, respectively, fitted into the highly precisely machined bores of an adaptor 5 such that the end portions of the optical fibers 1 and 4 are clamped in position.

However, in the prior art devices, adhesive is used at the time when the end portion of the optical fiber is fitted into the sleeve and fixed in the sleeve. In the case where laser beams of high output are transmitted by the optical fiber, the adhesive is rather absorbent of the laser beams. Accordingly, the known devices have such an inconvenience that since the laser beams leak out of outer peripheral surfaces of the optical fiber so as to be absorbed into the adhesive, the adhesive is so heated as to be molten, thereby aggravating reliability of the known devices. Furthermore, the prior art devices have such a disadvantage that since the end portion of the optical fiber is fixed in the sleeve by the adhesive, it is impossible to detach the end portion of the optical fiber from the sleeve.

SUMMARY OF THE INVENTION

Accordingly, an essential object of the present invention is to provide an improved device for detachably clamping an end portion of an optical fiber in a sleeve without using adhesive, which is excellent in reproducibility of a clamping position of the end portion of the optical fiber and in which the end portion of the optical fiber can be easily detached from the sleeve, with substantial elimination of the disadvantages inherent in conventional devices of this kind.

Another important object of the present invention is to provide an improved device of the above described type which is simple in structure and highly reliable in actual use.

In accomplishing these and other objects according to one preferred embodiment of the present invention, there is provided an improved device for clamping an end portion of an optical fiber, comprising: a cylindrical sleeve which is formed with an aperture extending through an axis thereof such that said end portion of said optical fiber is fitted into said aperture; said sleeve being formed, on an outer side face thereof, with at least one slit extending both radially from said outer side face to said aperture and axially therethrough along a plane containing said axis of said sleeve; said outer side face of said sleeve being at least partly tapered into a tapered outer side face; and an adaptor, itself having an axis, which is formed with a tapered bore corresponding, in shape, to said tapered outer side face of said sleeve.

In accordance with the present invention, reproducibility of the clamping position of the end portion of the optical fiber is excellent and the end portion of the optical fiber can be easily detached from the sleeve.

BRIEF DESCRIPTION OF THE DRAWINGS

These and other objects and features of the present invention will become apparent from the following description taken in conjunction with the preferred embodiment thereof with reference to the accompanying drawings, in which:

FIGS. 1a and 1b are longitudinal sectional views of prior art devices for clamping an end portion of an optical fiber, in which the end portion of the optical fiber is fixed and is joined to a mating end portion of another optical fiber, respectively (already referred to);

FIG. 2a is a longitudinal sectional view of a device for clamping an end portion of an optical fiber, according to the present invention;

FIG. 2b is a view similar to FIG. 2a, particularly showing application of the device of FIG. 2a to joining of end portions of two optical fibers;

FIG. 3 is a cross-sectional view taken along the line III—III in FIG. 2a, particularly showing a sleeve employed in the device of FIG. 2a;

Before the description of the present invention proceeds, it is to be noted that like parts are designated by like reference numerals throughout several views of the accompanying drawings.

DETAILED DESCRIPTION OF THE INVENTION

Figure 3:
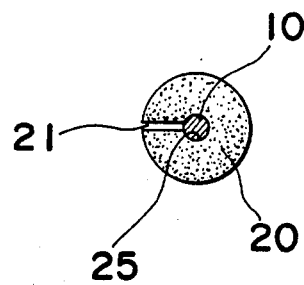

Referring now to the drawings, there is shown in FIGS. 2a and 3, a device K for clamping an end portion of an optical fiber 10, according to the present invention. The device K generally includes a cylindrical sleeve 20 and an adaptor 30. The sleeve 20 is formed with an aperture 25 extending through an axis thereof and having a diameter slightly larger than that of the optical fiber 10. An outer side face of the sleeve 20 is at least partly tapered into a tapered outer side face 26. The sleeve 20 further has at least one slit, for example, a slit 21 formed on its outer side face and extending radially from its outer side face to the aperture 25 and axially therethrough along a plane containing the axis of the sleeve 20. Meanwhile, the adaptor 30 is formed with a tapered bore 35 which extends along an axis of said adaptor, corresponding, in shape, to the tapered outer side face 26 of the sleeve 20.

In FIG. 3, the sleeve 20 is formed with the slit 21 as described above. The aperture 25 has a diameter larger than that of the optical fiber 10 by 5% or less. The end portion of the optical fiber 10 is fitted into the aperture 25 and then, the sleeve 20 having the end portion of the optical fiber 10 fitted into the aperture 25 is fitted into the tapered bore 35 of the adaptor 30 such that the tapered outer side face 26 of the sleeve 20 is brought into engagement with a side face of the tapered bore 35 of the adaptor 30. Thus, as the slit 21 of the sleeve 20 is gradually reduced in width upon fitting of the sleeve 20 into the tapered bore 35 of the adaptor 30, the end portion of the optical fiber 10 is firmly gripped, at the aperture 25, by the sleeve 20 and, at the same time, the end portion of the optical fiber 10 is brought into alignment with the axis of the sleeve 20.

Figure 4:
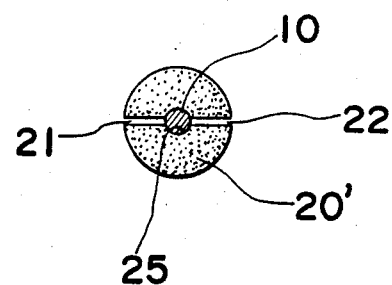
FIG. 4 is a view similar to FIG. 3, particularly showing a modification thereof.

Referring to FIG. 4, there is shown a sleeve 20' which is a modification of the sleeve 20. The modified sleeve 20' is formed with two slits, i.e., a slit 22 in addition to the slit 21 of the sleeve 20. Since the slits 21 and 22 are aligned with each other in a radial direction of the sleeve 20', the sleeve 20' is split into two half portions by the slit 21, the aperture 25 and the slit 22. Since other constructions of the sleeve 20' are similar to those of the sleeve 20, detailed description thereof is abbreviated for the sake of brevity.

Meanwhile, in the case where the end portion of the optical fiber 10 is joined to a mating end portion of another optical fiber 40, an adaptor 50 is employed in place of the adaptor 30 as shown in FIG. 2b. The adaptor 50 is formed with two tapered bores 55 and 56 which are disposed axially oppositely in alignment with each other. The two sleeves 20 having the optical fibers 10 and 40 fitted thereinto, respectively are, respectively, fitted into the tapered bores 55 and 56 so as to confront each other such that the end portions of the optical fibers 10 and 40 are joined to each other.

It will be readily understood from the foregoing that the end portion of the optical fiber 10 can be clamped by the device K without using adhesive or an elastic force of the sleeve 20 or 20'. Thus, as materials of the sleeve 20 or 20', for example, either non-elastic materials such as vitreous materials including carbon, silica glass, lead glass, etc. and such as ceramic sintered materials including alumina, silicon carbide, silicon nitride, etc. or elastic metallic materials such as stainless steel, brass, aluminium, etc. can be employed. It is desirable that the aperture 25 of the sleeve 20 or 20' has a diameter larger than that of the optical fiber 10 by 5% or less as described above. Furthermore, it is proper that the tapered outer side face 26 of the sleeve 20 or 20' is set at a taper of between 1/20 and 1/10. Meanwhile, it is proper that the slits 21 and 22 of the sleeves 20 and 20' have a width which occupies 20 to 30% of the diameter of the optical fiber 10. Moreover, as materials of the adaptors 30 and 50, materials suitable for precision machining, for example, either metallic materials such as stainless steel, brass, aluminium, etc. or ceramic sintered materials such as alumina, silicon carbide, etc. can be employed.

Figure 5A:
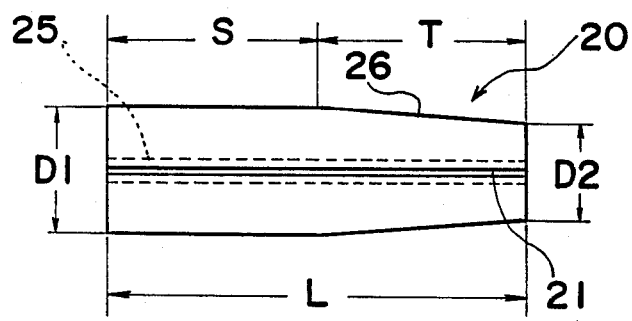
FIGS. 5a and 5b are a side elevational view and a front elevational view of the sleeve of FIG. 3; respectively.
Figure 5B:
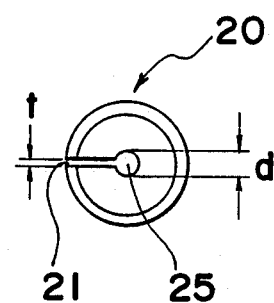

Hereinbelow, one example of the sleeve 20 (FIG. 3) which was actually manufactured will be described with reference to FIGS. 5a and 5b. In this example, the optical fiber 10 having a diameter of 0.70 mm was employed. The sleeve 20 is made of stainless steel. Supposing that characters L, S and T denote an overall length of the sleeve 20, a length of a straight portion of the sleeve 20 and a length of a tapered portion of the sleeve 20, respectively, the dimensions L, S and T assume values of 14 mm, 7 mm and 7 mm, respectively. The 7 mm long tapered portion of the sleeve 20 is of a taper of 1/10. A diameter d of the aperture 25 is 0.73 mm. A diameter D1 of the straight portion of the sleeve 20 is 4 mm, while a smaller diameter D2 of the tapered portion of the sleeve 20 is 3.3 mm. Furthermore, a width t of the slit 21 is 0.2 mm, i.e., about 28% of the diameter of the optical fiber 10. Although not specifically shown, the adaptor 30 formed with the tapered bore 35 corresponding to the tapered portion of the sleeve 20 of this example was also actually manufactured. The end portion of the optical fiber 10 is fitted into the aperture 25 of the sleeve 20 and then, the sleeve 20 is fitted into the tapered bore 35 of the adaptor 30, which is also of a taper of 1/10, whereby the end portion of the optical fiber 10 is clamped by the device K. As described above, the diameter d of the aperture 25 of the sleeve 20 is 0.73 mm and is about 4% larger than the diameter of the optical fiber 10, which is 0.70 mm. Thus, as the sleeve 20 is gradually deeply fitted into the tapered bore 35 of the adaptor 30, the diameter d of the aperture 25 is reduced to the diameter of the optical fiber 10 such that the optical fiber 10 is firmly gripped, at the aperture 25, by the sleeve 20.

Figure 6A:
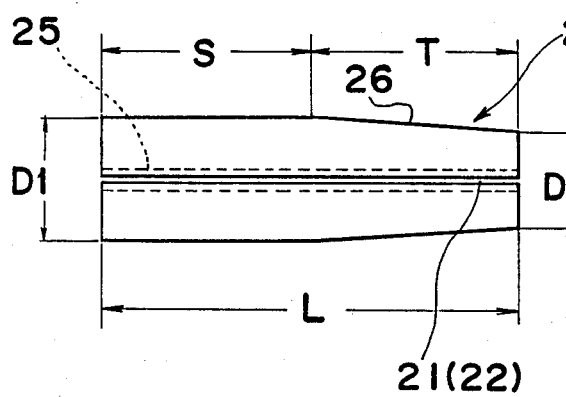
FIGS. 6a and 6b are a side elevational view and a front elevational view of the sleeve of FIG. 4; respectively.
Figure 6B:
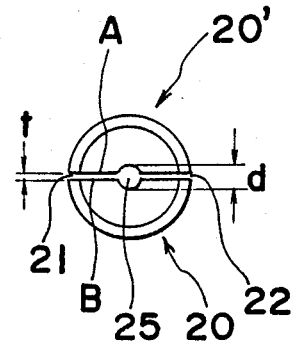

Referring further to FIGS. 6a and 6b, there is shown one example of the sleeve 20' (FIG. 4) which was actually manufactured. In this example, the optical fiber 10 having a diameter of 0.70 mm was employed in the same manner as the above example of the sleeve 20. In FIGS. 6a and 6b, all the dimensions L, S, T, D1, D2, d and t of the sleeve 20' assume the same values as those of the above example of the sleeve 20. Since the sleeve 20' is split into two half portions by the slits 21 and 22 and the aperture 25, opposed faces A and B of the slits 21 and 22 are, respectively, deviated by 0.1 mm upwardly and downwardly from a horizontal centerline of the sleeve 20' in FIG. 6b so as to define the width t of 0.2 mm therebetween when the two half portions of the sleeve 20' are so disposed as to define the diameter D1 of 4 mm. The end portion of the optical fiber 10 having the diameter of 0.70 mm is interposed, at the aperture 25, between the two half portions of the sleeve 20' and then, the sleeve 20' is fitted into the tapered bore 35 of the adaptor 30. Thus, since the end portion of the optical fiber 10 is firmly gripped, at the aperture 25, between the two half portions of the sleeve 20', the end portion of the optical fiber 10 is clamped by the device K.

It will be readily seen from the above examples of the sleeves 20 and 20' that since the diameter of the aperture 25 is slightly larger than that of the optical fiber 10, the end portion of the optical fiber 10 can be easily clamped by the device K and can be easily detached from the sleeve 20 or 20' by reversing the above described operational steps.

Furthermore, since the end portion of the optical fiber is clamped by the device K through contact of the outer peripheral surface of the optical fiber 10 with the side face of the aperture 25 of the sleeve 20 or 20', a contact surface area between the optical fiber and the sleeve 20 or 20' becomes smaller than that of the known devices in which adhesive is employed in order to clamp the end portion of the optical fiber in the sleeve through overall contact therebetween, so that leakage of light out of the device K is remarkably reduced as compared with that of the known devices and further, such an undesirable phenomenon does not readily take place that contact portions of the optical fiber and the sleeve 20 or 20' are damaged by the light.

As is clear from the foregoing description, in the device of the present invention, since the sleeve formed with the tapered outer side face and the slit, and the adaptor formed with the tapered bore corresponding, in shape, to the tapered outer side face of the sleeve are employed, the end portion of the optical fiber can be firmly clamped without the need for using adhesive and such an undesirable phenomenon associated with the known devices during transmission of laser beams of high output does not take place that the contact portions of the optical fiber and the sleeve are damaged by the laser beams, so that reliability of the device is improved and the end portion of the optical fiber can be easily detached from the sleeve.

Furthermore, in accordance with the present invention, since the taper configurations of the sleeve and the adaptor are also designed to align the end portion of the optical fiber with the axis of the sleeve, reproducibility of a clamping position of the end portion of the optical fiber is improved. Accordingly, the device of the present invention can be most suitably used for clamping the end portion of the optical fiber, which is fixed or joined to a mating end portion of another optical fiber. Especially, the device of the present invention can be advantageously applied to input/output connectors for the optical fiber for transmitting laser beams of high output.

Although the present invention has been fully described by way of example with reference to the accompanying drawings, it is to be noted here that various changes and modifications will be apparent to those skilled in the art. Therefore, unless otherwise such changes and modifications depart from the scope of the present invention, they should be construed as being included therein.

What is claimed is:

1. A device for clamping an end portion of an optical fiber, comprising:
   a cylindrical sleeve which is formed with an aperture extending through an axis thereof such that said end portion of said optical fiber is fitted into said aperture;
   said sleeve being formed, on an outer side face thereof, with at least one slit extending both radially from said outer said face to aperture and axially therethrough along a plane containing said axis of said sleeve;
   said outer side face of said sleeve being at least partly tapered into a tapered outer side face so as to define a conical form; and
   an adaptor having an axis and which is formed with an axially extending tapered bore corresponding, in shape, to said tapered outer side face of said sleeve, said outer side face of said sleeve being receivable in said bore whereby said optical fiber may be clamped so as to be precisely centered with respect to the axis of said adaptor.

2. A device as claimed in claim 1, wherein said sleeve is formed with two slits.

3. A device as claimed in claim 2, wherein said two slits are aligned with each other in a radial direction of said sleeve such that said sleeve is split into two half portions by said two slits and said aperture.

4. A device as claimed in claim 1, wherein said tapered outer side face of said sleeve is set at a taper of between 1/20 and 1/10.

5. device as claimed in claim 2, wherein said tapered outer side face of said sleeve is set at a taper of between 1/20 and 1/10.

6. A device as claimed in claim 3, wherein said tapered outer side face of said sleeve is set at a taper of between 1/20 and 1/10.

7. A device as claimed in claim 4, wherein said aperture of said sleeve has a diameter larger than that of said optical fiber by 5% or less,
   said slit of said sleeve having a width occupying 20 to 30% of the diameter of said optical fiber.

8. A device as claimed in claim 5, wherein said aperture of said sleeve has a diameter larger than that of said optical fiber by 5% or less,
   said slits of said sleeve having a width occupying 20 to 30% of the diameter of said optical fiber.

9. A device as claimed in claim 6, wherein said aperture of said sleeve has a diameter larger than that of said optical fiber by 5% or less,
   said slits of said sleeve having a width occupying 20 to 30% of the diameter of said optical fiber.

10. A device as claimed in claim 1, wherein said sleeve is made of either one of non-elastic materials such as vitreous materials including carbon, silica glass and lead glass and such as ceramic sintered materials including alumina, silicon carbide and silicon nitride or one of elastic metallic materials such as stainless steel, brass and aluminium,
    said adaptor being made of either one of metallic materials such as stainless steel, brass and aluminium or one of ceramic sintered materials such as alumina and silicon carbide.

11. A device as claimed in claim 7, wherein said sleeve is made of either one of non-elastic materials such as vitreous materials including carbon, silica glass and lead glass and such as ceramic sintered materials including alumina, silicon carbide and silicon nitride or one of elastic metallic materials such as stainless steel, brass and aluminium,
    said adaptor being made of either one of metallic materials such as stainless steel, brass and aluminium or one of ceramic sintered materials such as alumina and silicon carbide.

12. A device as claimed in claim 8, wherein said sleeve is made of either one of non-elastic materials such as vitreous materials including carbon, silica glass and lead glass and such as ceramic sintered materials including alumina, silicon carbide and silicon nitride or one of elastic metallic materials such as stainless steel, brass and aluminium,
    said adaptor being made of either one of metallic materials such as stainless steel, brass and aluminium or one of ceramic sintered materials such as alumina and silicon carbide.

13. A device as claimed in claim 9, wherein said sleeve is made of either one of non-elastic materials such as vitreous materials including carbon, silica glass and lead glass and such as ceramic sintered materials including alumina, silicon carbide and silicon nitride or one of elastic metallic materials such as stainless steel, brass and aluminium,
    said adaptor being made of either one of metallic materials such as stainless steel, brass and aluminium or one of ceramic sintered materials such as alumina and silicon carbide.

14. A device for clamping together the end portion of a pair of optical fibers, comprising:

a pair of cylindrical sleeves, each of which is formed with an aperture extending along an axis thereof such that said end portion of said optical fiber is fitted into said aperture;

each of said sleeves being formed, on an outer side face thereof, with at least one slit extending both radially from said outer side face to said aperture and axially therethrough along a plane containing said axis of said sleeve;

said outer side face of each of said sleeves being at least partly tapered into a tapered outer side face so as to define a conical form; and an adaptor having an axis and which is formed with a pair of axially extending tapered bores corresponding, in shape, to said tapered outer side faces of said sleeves, said outer side faces being receivable in said bores, respectively;

whereby each of said pair of optical fibers may be clamped for engagement with one another so that each fiber is axially centered with respect to said axially extending bores and aligned with each other.

* * * * *